US00RE39643E

(19) United States
(12) Reissued Patent
Kelly

(10) Patent Number: US RE39,643 E
(45) Date of Reissued Patent: May 22, 2007

(54) WIDE FIELD OF VIEW IMAGING SYSTEM

(76) Inventor: Shawn L. Kelly, 3011 White Hawk Trail, Colorado Springs, CO (US) 80908

(21) Appl. No.: 09/478,849

(22) Filed: Jan. 6, 2000

Related U.S. Patent Documents

Reissue of:
(64) Patent No.: 5,706,137
Issued: Jan. 6, 1998
Appl. No.: 08/284,845
Filed: Aug. 2, 1994

U.S. Applications:
(

(63) Continuation-in-part of application No. 07/948,662, filed on Sep. 22, 1992, now Pat. No. 5,406,415.

(51) Int. Cl.
*G02B 27/14* (2006.01)

(52) U.S. Cl. ..... 359/633; 359/362; 359/367
(58) Field of Classification Search ..... 359/13–15, 359/33, 362, 364–366, 588, 563, 566, 562, 359/572, 619–627, 726–732, 1–32, 462–469, 359/628–637
See application file for complete search history.

(56) References Cited

U.S. PATENT DOCUMENTS 3,549,803 A * 12/1970 Becht et al. ..... 359/631
3,915,548 A * 10/1975 Opittek et al. ..... 359/19
4,480,169 A * 10/1984 Macken ..... 219/121
4,669,810 A * 6/1987 Wood ..... 359/15
4,729,634 A * 3/1988 Raber ..... 359/630
4,968,117 A * 11/1990 Chern et al. ..... 359/573
5,093,567 A * 3/1992 Staveley ..... 250/221
5,124,821 A * 6/1992 Antier et al. ..... 359/14
5,164,848 A 11/1992 Firth et al. ..... 359/13
5,187,597 A * 2/1993 Kato et al. ..... 359/22
5,245,469 A 9/1993 Goto ..... 359/362
5,285,314 A * 2/1994 Futhey ..... 359/572
5,313,326 A * 5/1994 Ramsbottom ..... 359/633
5,341,242 A * 8/1994 Gilboa et al. ..... 359/633
5,406,415 A * 4/1995 Kelly ..... 359/633
5,418,584 A * 5/1995 Larson ..... 359/634
5,467,104 A 11/1995 Furness, III et al. ..... 345/8
5,477,385 A * 12/1995 Freeman ..... 359/629
5,673,146 A * 9/1997 Kelly ..... 359/462
5,683,297 A 11/1997 Raviv et al. ..... 463/34
5,701,132 A 12/1997 Kollin et al. ..... 345/8
5,969,871 A 10/1999 Tidwell et al. ..... 359/620
6,157,352 A 12/2000 Kollin et al. ..... 345/8

OTHER PUBLICATIONS

W. J. Smith, *Modern Optical Engineering*, McGraw–Hill, 1966, pp. 212–213.

Boult, T.E. Wolberg, G., "Correcting chromatic aberrations using image warping", Jun. 15–18, 1992, 1992 IEEE Computer Society Conference on Computer Vision and Pattern Recognition, 1992, *Proceedings* CVPR '92.

* cited by examiner

*Primary Examiner*—Thong Q. Nguyen
(74) *Attorney, Agent, or Firm*—Raggio & Dinnin, P.C.

(57) ABSTRACT

A wide FOV imaging system (10) includes an objective lens (14), a convergent reflective element (18) positioned proximate an intermediate image (16) formed by the objective lens, and a re-imaging lens (20) for re-imaging the intermediate image. The present invention significantly improves image fidelity while minimizing optical components by utilizing a convergent reflective element proximate the intermediate image to reverse the propagation of aberrations produced by the objective lens (14) to, as a result, significantly cancel or reduce the aberrations contributed by the re-imaging lens.

56 Claims, 2 Drawing Sheets

Amended

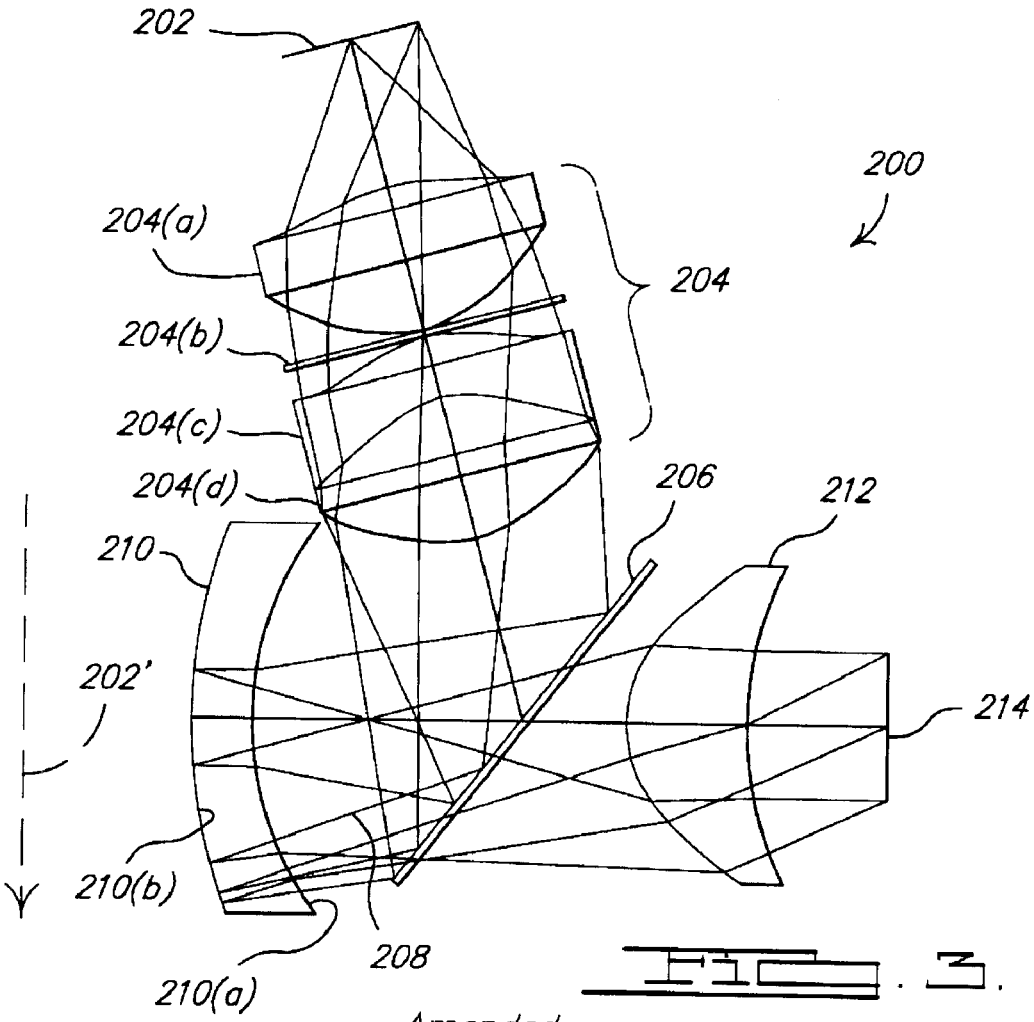
FIG. 3.
Amended
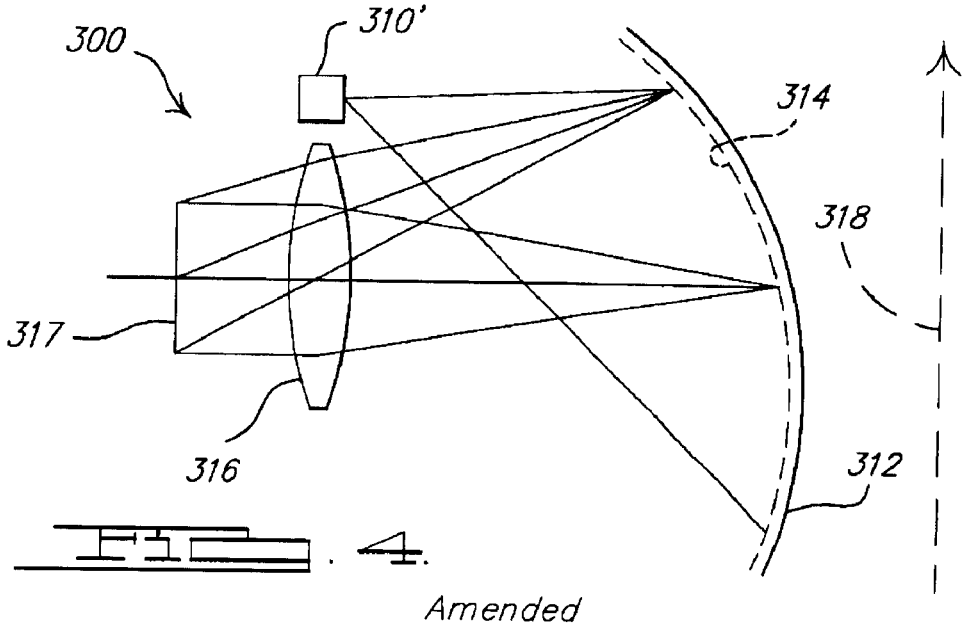
FIG. 4.
Amended

WIDE FIELD OF VIEW IMAGING SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of application Ser. No. 948,662 filed on Sep. 22, 1992, now U.S. Pat. No. 5,406,415.

BACKGROUND OF THE INVENTION

The present invention relates generally to optical imaging systems, and more particularly to a compact optical imaging system exhibiting a wide field of view (FOV), large exit pupil, large eye relief, or a combination thereof.

Optical systems, while their designs are quite varied, primarily serve to collect radiation from a finite dimensional or angular object to form an image for later use. The goal of optical design is to maximize the fidelity of the image as required for such later use while producing a practical configuration of optical system elements. Generally, a low number of optical elements is desired to minimize cost and system size, while a greater number is desired to offer sufficient design flexibility to minimize optical aberrations and therefore achieve the highest image fidelity. This competitive design environment becomes even more problematic as the desired field of view, exit pupil or eye relief are increased because such increases lead to significantly greater optical aberrations. This in turn increases the number and cost of optical elements required by the imaging system to maintain acceptable image quality.

Many optical imaging systems such as microscopes and telescopes utilize a positive objective lens to produce an intermediate image which is later re-imaged by another positive ocular or eye lens. Unfortunately, the aberrations of multiple positive lenses tend to compound themselves. However, positive lens aberrations are in certain cases opposite in sign compared to the same aberrations in a negative lens. Thus, many imaging systems employ a combination of predominantly positive and less powerful negative lens elements to minimize aberrations. Therefore, since such compounding of lenses requires many more elements, such a technique has only limited utility in systems which must be practically produced with low cost and in compact configurations while also providing a large FOV, exit pupil and/or eye relief.

Further, known imaging systems try to produce a wider field of view by employing a positive field lens at or near the intermediate image. However, such arrangements for widening the field of view are not satisfactory since the field lenses do not serve to make such systems more compact, and they can add significant aberrations to the intermediate image if such lenses are particularly powerful or if there is significant field curvature in the intermediate image.

SUMMARY OF THE INVENTION

It is therefore an object of the invention to provide an improved optical system design.

It is a further object of the invention to provide an improved optical system design which provides for a large field of view, eye relief and/or exit pupil while minimizing the necessary optical elements.

It is another object of the invention to provide a low cost, compact optical system which provides for a large field of view, eye relief and/or exit pupil.

It is yet another object of the present invention to provide a wide FOV imaging system which utilizes a convergent reflective surface to both correct aberrations generated by an objective lens in an intermediate image, and precorrect for aberrations generated by a re-imaging eye lens.

In accordance with the present invention, an optical system comprises a means for forming an intermediate image of an object, a convergent reflective surface proximate the intermediate image, and a means for re-imaging the intermediate image to a location displaced or distanced from the object location. The convergent reflective surface may comprise a concave mirror, flat Fresnel lens, concave projection screen, or combination thereof.

In further accordance with the invention, an optical system comprises a scanning, narrow-beam projection means which forms an intermediate image onto a concave, light-scattering screen proximate the intermediate image, and a means for re-imaging the intermediate image to a location displaced or distanced from the projection means.

In further accordance with the present invention, an optical imaging system comprises an object imaging means for forming an intermediate image of an object image, wherein the object imaging means produces particular aberrations in the intermediate image, an aberration reversing means for reversing at least some of the aberrations in the intermediate image comprising a convergent reflective surface positioned proximate the intermediate image, and a re-imaging means for re-imaging the intermediate image. The re-imaging means provides image aberrations similar to those provided by the object imaging means, thereby significantly cancelling or reducing those aberrations in the intermediate image which were reversed by the aberration reversing means. The imaging system can further comprise a beam splitter positioned between the object imaging means and the reflective surface, or between the reflective surface and the re-imaging means.

The present invention accommodates the use of relatively simple positive lenses for both the objective and eye lens by employing a convergent mirror proximate an intermediate image to significantly cancel or reduce particular positive lens aberrations. In effect, the convergent mirror reverses the sign of such aberrations as created by the positive objective lens so that the now negative aberrations propagating from the mirror are cancelled or significantly reduced by the positive aberrations applied by the eye lens.

The present invention will be more fully understood upon reading the following detailed description of the several embodiments in conjunction with the accompanying drawings.

BRIEF DESCRIPTION OF THE DRAWINGS

FIG. 3 is a schematic illustration of a third embodiment of a wide FOV imaging system in accordance with the present invention particularly useful with a head mounted display; and FIG. 4 is a schematic illustration of a fourth embodiment of a wide FOV imaging system in accordance with the present invention.

DETAILED DESCRIPTION OF THE PREFERRED EMBODIMENT(S)

Figure 1:
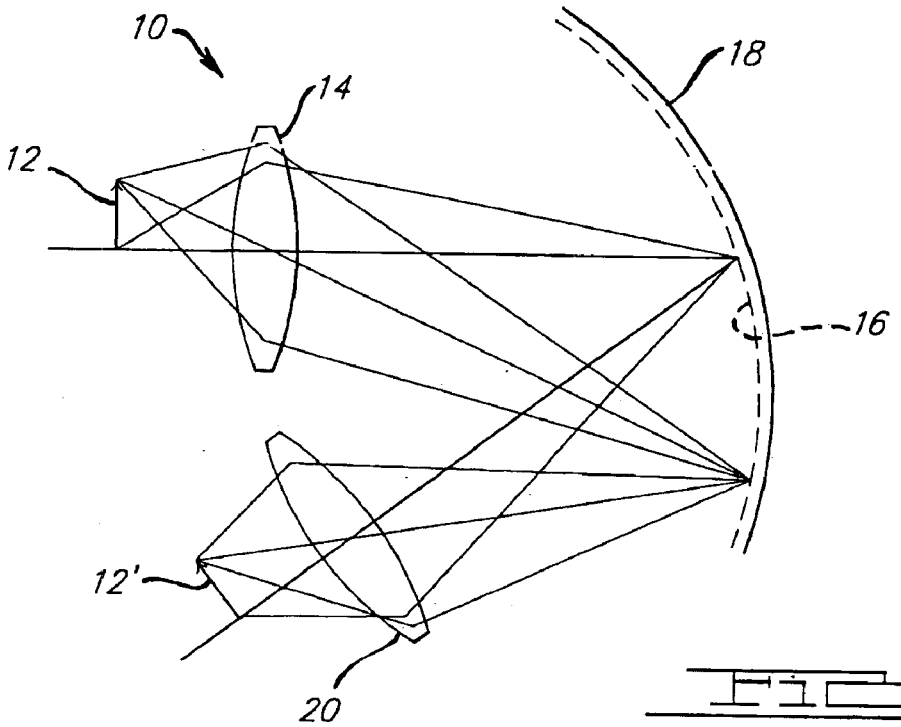
FIG. 1 is a schematic illustration of a first embodiment of a wide FOV imaging system in accordance with the present invention.

A first embodiment 10 of the present invention is shown in FIG. 1 wherein an object 12 is imaged by an objective lens 14 to form an intermediate image 16. A convergent mirror 18 is placed proximate the intermediate image 16 and tilted or positioned to direct the reflected light toward lens 20 to form an image 12'. The focal length, proximity to the intermediate image and other optical properties of the convergent mirror 18 are selected through use of conventional optical design optimization methods to best compensate for the aberrations produced by lenses 14 and 20.

Figure 2:
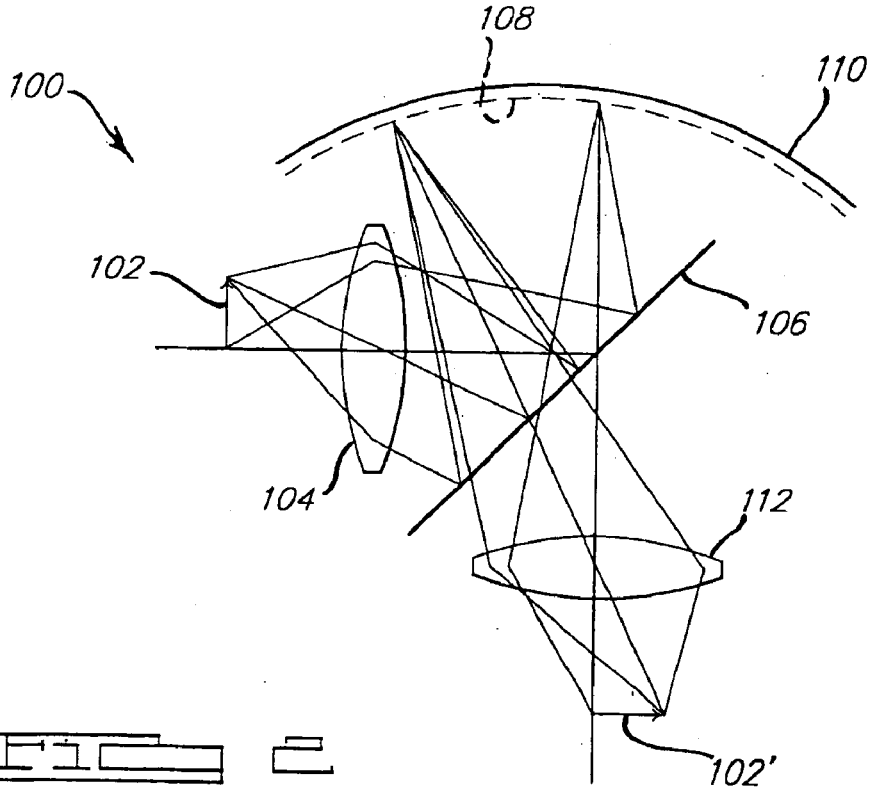
FIG. 2 is a schematic illustration of a second embodiment of a wide FOV imaging system in accordance with the present invention.

A second embodiment 100 of the present invention is shown in FIG. 2 wherein an object 102 is imaged by an objective lens 104 and reflected off of beam splitter 106 to form an intermediate image 108. A convergent mirror 110 is placed proximate the intermediate image 108 to direct the reflected light back through beam splitter 106 and lens 112 to form an image 102'.

With the exception of the beam splitter 106, the components of both embodiments 10 and 100 perform similar functions. The lenses 14 and 104 comprise any combination of optical elements to produce an intermediate image. Such lenses include, but are not limited to, the objective lenses of telescopes, microscopes, binoculars, beam expanders and simple magnifiers. The lenses 20 and 112 comprise any combination of optical elements to re-image the intermediate image to form the respective images 12' and 102'. Such lenses also include, but are not limited to, the eye or magnifying lenses of the aforementioned devices, and may further include the human eye lens or a camera lens. Note that the objects 12 and 102, and also the images 12' and 102' may be significantly distanced from the optical elements of the system, and that the images 12' and 102' may also be virtual images.

The mirrors 18 and 110 comprise any structure or combination of elements to reflect the light incoming from the objective lens into the lens used to re-image the intermediate image in such a way as to, at least in part, reverse the aberrations in the rays comprising said incoming light. One of ordinary skill will readily appreciate that such mirrors include, but are not limited to, a first or second surface concave mirror, a flat convergent Fresnel, diffractive or holographic structure, or a combination thereof, wherein such structures may be applied to a concave surface. The reversing properties of such mirrors are designed in conjunction with the other optical elements of the system to minimize optical aberrations using conventional techniques of optical design. Of particular advantage is the concave second surface mirror wherein the light from the object passes through the mirror substrate to reach the reflective coating on the back of the substrate and then again passes through the substrate toward the re-imaging lens. In this case, the mirror substrate may be effectively designed as a negative lens with a concave first surface in front of the mirror, exploiting the advantages of the present invention in combination with the previously mentioned conventional techniques of matching negative and positive lenses to reduce aberrations. In all cases, the curvature of the first surface of such a mirror will ultimately be determined through optimization of the optical system as a whole.

The beam splitter 106 provides an alternative arrangement from the tilted mirror 18 of the first embodiment 10 for directing the light, because such tilting creates asymmetric aberrations which are difficult to correct. Such a beam splitter, shown generically in FIG. 2, comprises any means of passing light from the objective lens to the convergent mirror while reflecting light from the convergent mirror to the re-imaging lens or vice verse. Such beam splitters include, but are not limited to, flat single or multi-stack windows, polarizing beam splitters, cube beam splitters, partially reflective coatings, and other elements used in combination with such means to facilitate the best use of such devices.

A third embodiment 200 of the invention is shown in FIG. 3, wherein the advantages of the previous embodiments are coupled with further improvements to yield an optical system design ideal for a wide field of view magnifier. Such a magnifier can be used in many applications but is particularly ideal for a compact head-mounted display wherein one such system may be used for each eye for stereo viewing. FIG. 3 represents a side-view profile of the imaging system 200, wherein an object 202 is imaged by a compound objective lens 204 to form an intermediate image 208 after reflecting off of a beam splitter 206 and a second-surface concave mirror 210. The light from the intermediate image 208 continues through the beam splitter 206 to be re-imaged by the lens 212 *through an exit pupil 214* to form a virtual image 202' located substantially distant from the optical system 200. The object 202 comprises either an actual object or the image of an object, and in the particular case of a head-mounted display, generally comprises the image produced by an electronic imaging device including, but not limited to, a cathode ray tube or liquid crystal display.

The compound lens 204 generally includes a positive collimating lens 204(a); a transparent spatial filter 204(b) to remove artificial image artifacts from the object 202 and to provide a limited increase in depth of focus to the system; a negative lens 204(c) to provide limited aberration correction to the collimating lens 204(a); and a positive lens 204(d) which focuses the collimated image provided by the previous lenses to initially form the intermediate image 208. Note that in this particular embodiment of the invention, the object is proximate the optical system whereas the image is substantially distant. In accordance with keeping the aberrations of the positive lenses 204(d) and 212 fairly similar, the purpose of the first two lenses 204(a) and 204(c) can be thought of as forming a virtual object substantially distant from the optical system so that the system is fairly symmetric from lens 204(d) to lens 212. It should be further noted that the embodiment 200, in forming a substantially collimated area within the compound lens 204, provides a particular advantage over other magnifiers in that spatial filtering can be accomplished inside the optical system. Since spatial filtering is customarily performed in an area of collimation, and since typical prior art compact magnifiers provide such an area only after the last lens element, the spatial filter necessarily decrease eye relief in such systems, a problem obviated by the present invention as shown in embodiment 200.

The concave second-surface mirror 210 comprises two surfaces 210(a) and 210(b) of a single substrate whereon the back surface 210(b) is placed a reflective coating. The mirror 210 therefore effectively serves three functions in one element. As the light first passes through surfaces 210(a) and 210(b) from the lens 204(d), the mirror substrate acts as a negative lens to assist in correcting aberrations produced by lens 204(d). The reflective surface 210(b) serves to reverse the propagation direction of at least part of the aberrations from lens 204(d) as well as some residual aberrations from the objective lens as a whole. Finally, through the second pass of light through surfaces 210(b) and 210(a), in the reverse direction of the first pass, the substrate again acts as a negative lens, this time to assist in pre-correcting aberrations produced by lens 212.

It should be finally noted that the intermediate image 208 which is formed after the concave mirror 210 is not nor should it necessarily be a high fidelity image in this particular embodiment. One will note that while the center location in the object 202 does form a reasonably sharp focus on the optical axis in the intermediate image, the light rays from the edge location in the object do not form such a sharp focus. This should be entirely expected because while lens 212 will not produce significant aberrations on the optical axis, it will produce severe aberrations toward the edge of the field of view. Therefore since the intermediate image zone should exhibit the reverse of the aberrations produced by the lens 212, the magnitude and sign of such reversed aberrations should correspond to the magnitude and opposite sign of those produced by the lens.

In each of the above embodiments, the proximity of the means of reversing the light to the intermediate image is determined by optimization of the optical system as a whole. In general, it is desirable that the intermediate image reside at least slightly away from such reversing means so that the re-imaging lens does not also image defects, undesirable structures or dust associated with the light reversing structure.

The operation of the present invention results from three component yet overlapping principles responsible for the improvements created by the placement and design of a convergent mirror proximate the intermediate image. The first principle involves adding elements which produce negative aberrations to cancel those produced by the positive elements. A convergent mirror produces some aberrations which are opposite those of positive lenses. By placing the mirror proximate the intermediate image however, the negative aberration contributions of the mirror can be symmetrically applied to both positive lenses. In effect, the single mirror is therefore providing the aberration cancellation of two negative lens elements each of which would normally be used for the two positive lenses. Thus in a sense, the mirror is acting on the aberrations of the object lens primarily to reverse the sign of those aberrations, not to cancel them, as they propagate toward the re-imaging lens.

The second principle responsible for operation of the invention is based on the approximation of the concave mirror in proximity to the intermediate image as a phase conjugation device. While this principle is more complex than the first principle, it is much more thorough in explaining how the invention operates. Consider first a single positive lens used to image an object scene. Rays from various object points will be imaged by the lens to exhibit many of the classic optical aberrations such as distortion, field curvature, spherical aberrations, coma, astigmatism and chromatic aberration. Now, consider that some means is used to exactly reverse or phase conjugate the propagation direction of each light ray in this intermediate image space to reflect back upon itself through the lens to form yet another image superimposed over the object. By the principle of reciprocity, this second image will form an exact image of the object, albeit within the diffraction limit of the lens, and will consequently be totally free of aberrations.

While a simple mirror conventionally placed in an optical system will not completely reverse the propagation direction of each ray, the present invention, in applying a concave mirror proximate the intermediate image, exhibits many of the benefits of such complete reversal by providing approximately some of the same effects to achieve a practical and significant reduction in the aberrations caused by the positive lenses.

Effectively, the aforementioned means of completely reversing the propagation of each ray can be considered as an additional imaging system independent of the single positive lens. In accordance with such a consideration, the reversing means acts on the rays of light exiting the lens and images those rays back onto the lens such that the exiting and imaged rays are collinear. The concave mirror is designed to act as a similar imaging system to achieve the benefits of such reversal in that it is placed proximate the intermediate image and the objective and re-imaging lenses are generally placed approximately at the radius of curvature of the mirror. Accordingly, light rays exiting the objective lens are effectively imaged by the mirror onto the re-imaging lens.

This perspective provides a convenient means of explaining the primary difference between the concave mirror and the complete reversing means. A complete reversal of light rays implies that the rays exiting the objective lens map to an image of those rays on the re-imaging lens such that they are in completely correct orientation with respect to the exiting rays. This only partially occurs with the concave mirror. For every bundle of rays emanating from a given object point and exiting the objective lens, the image of that bundle on the re-imaging lens formed by the concave mirror will be inverted, about the center of the bundle, with respect to the orientation of that bundle as it exits the objective lens. This means that some light rays, especially those at the edge of the ray bundle, will not pass through both objective and re-imaging lenses at the same location and with the same directionality as they would if a complete reversal had occurred, resulting in less than a perfect result. In other words, only the centers of the respective ray bundles can potentially achieve complete reversal, while such reversal degrades with distance of rays in the bundle away from its center. However, the consequence of this difference, even if the concave mirror is replaced by a less effective convergent Fresnel or other convergent mirror form, is far outweighed by the benefits of the amount of reversal which does occur in accordance with the teachings of the present invention.

A third principle by which the present invention operates also explains in part why the aforementioned ray bundle reversal is not deleterious in the case when the convergent mirror is placed proximate the intermediate image. Consider again a single axisymetric positive lens imaging an object to form an intermediate image. In this case however, further consider that the lens is designed to correct all forms of aberrations such that only field curvature and distortion exist. Such an intermediate image will therefore be in sharp focus only over an intermediate image surface conforming to the field curvature of that image. In other words, if a light scattering screen were placed exactly at the intermediate image with a curvature identical to the field curvature of the positive lens, then the image formed on that screen would be in perfect focus over the entire screen with perhaps some residual distortion. Thus, the positive lens has imaged each point in the object to a sharp, in-focus image of that point in the intermediate image. In order to form such a sharp, in-focus point image, the light rays from the positive lens to any point in the intermediate image must be convergent on that point.

Now consider that the light from that focused point in the intermediate image is reflected or scattered back to the positive lens. By the principle of reciprocity, since the lens operates on an object point to form a sharp image point at the intermediate image, the reverse must also be true, within the limits of diffraction. Thus if the intermediate image of a point is sharp and in focus, and if that image is scattered or reflected back into the positive lens, [than] *then* the light from that image will be re-imaged on the object with similar quality. Note that the distortion and field curvature of the intermediate image are of no consequence because the reflection or scattering from the intermediate image surface has reversed the sign of those aberrations to be exactly cancelled by the lens. It should be noted that this process also applies to lateral chromatic aberration. As long as the image of every color is in focus in the intermediate image, regardless of the relative displacement of those colors in the image, any dispersion by the lens must be exactly cancelled out as the reflected or scattered rays diverging from the image pass back through the lens.

This third principle is valid providing the positive lens used in the example provides an aperture for the bundle of rays forming the intermediate image similar to that for the bundle of rays propagating back toward the object space. However, within this restriction, the actual position of the reverse propagating ray within this aperture is inconsequential, because every ray entering the aperture from a given intermediate image point must form on the corresponding object point. Thus, in this limited case, reflection or scattering from the intermediate image surface becomes just as effective as complete phase conjugation.

Applying such convergent mirrors in accordance with the aforementioned principles of the present invention directly provides both the ability to use fewer lenses in attaining a particular image quality and also the ability to achieve larger fields of view, exit pupils and eye reliefs in a compact imaging system. Once again, the above discussion of the operation of the convergent mirror is limited only to a general explanation of how the mirror is used in principle to minimize aberrations. With the general use of one or more of the principles, the actual proximity of the mirror to the intermediate image, and the other optical specifications of the optical system will be determined by optimizing the system as a whole.

Further, the convergent mirror discussed in the above embodiments can, in more limited situations and as described by the third principle above, be replaced by a concave projection screen which operates by scattering or dispersing light rather than by specularly reflecting it. In general, such a screen includes a concave surface having a structural or physical property including a means for redistributing the light incident on any point on the concave surface from a given cone of incidence originating at that point into a new cone of exodus from that point larger than the incidence cone. Such means includes but is not limited to scattering surfaces, binary or diffractive optical surfaces, lenticular surfaces, Fresnel surfaces, microlens surfaces, or holographic surfaces. In such cases, the screen must conform with the intermediate image surface. While use of such a screen does not offer the full flexibility of a convergent mirror as described above it does allow for a magnification between the aperture of the objective lens and the exit pupil of the eye lens not offered in known, conventional designs. Thus very small aperture objective lenses can be employed while maintaining a large exit pupil.

This advantage offers yet another embodiment 300 of the invention as shown in FIG. 4. Consider a re-imaging lens which has been optimized to act on an intermediate image formed on a concave projection screen. Now consider that a scanning and modulated laser beam is used to directly form an intermediate image onto the projection screen. Since the exit pupil of the re-imaging lens is substantially independent of the size of the laser beam, the beam can be made so fine that focusing of the beam to form a focused scanning spot will not be required. As shown in FIG. 4, a scanning, modulated image source [310] *310'* is placed approximately at the radius of curvature of a concave projection screen 312. The image source [310] *310'* produces a fine scanning beam which is modulated in intensity as it scans to form an intermediate image 314 on screen 312. Screen 312 [scatters] *redistributes* the energy from the image source [310] *310'* to fill the [entrance aperture] *exit pupil 317* of a re-imaging lens 316 which in turn forms a distant virtual image 318 of the intermediate image.

In accordance with the present invention, the image source [310] *310'* comprises any means of forming a fine scanning spot on the projection screen 312 to form the intermediate image 314, including, but not limited to, a monochromatic or polychromatic scanning laser projector. The projection screen 312 comprises any suitable material or device to scatter the light from the intermediate image 314 into the entrance [aperture] *pupil* of the re-imaging lens 316. Preferably, such scattering will be confined such that all the light from the intermediate image [310] *314* enters and uniformly fills the entrance [aperture] *pupil* of the lens 316. Note that such a screen material or device may further comprise a surface which not only scatters the energy from the image source [310] *310'* but also which may absorb the light and re-emit it as the intermediate image 314. Note further that if the image source is such that polychromatic light is produced wherein each color can be scanned to form a full-color composite intermediate image 314, then each color component intermediate image should be scanned to pre-aberrate the intermediate image to [accommodate] *correct for* lateral chromatic aberration in the re-imaging lens 316. Note finally that the [unique combination of] *relative* independence between the *projector* beam size and the re-imaging lens [aperture and] *exit pupil, in combination with* the narrow *projector* beam size, allows the projector to be located off-axis as shown in FIG. 4, providing that the intermediate image formed by the projector is created as an off-axis image. This advantage is made possible by the very long relative depth of focus of the intermediate image.

While FIG. 4 illustrates a simple representative embodiment of the use of a narrow beam projector in the invention, attributes of previous embodiments may also be used in combination with this embodiment for increased benefit. For example, a beam splitter may be used to eliminate the need for off-axis imaging. A second surface screen may also be used to provide additional aberration correction.

Finally, the present invention is best practiced by employing an aberration reversing means which most closely provides the full properties of phase conjugation as described above. Several reflective and scattering surfaces and structures have been mentioned to at least partially provide such properties. Of particular benefit however, is the use of a concave surface with an additional structure placed thereon. For example, a Fresnel lens structure may be formed on a concave surface. Such a hybrid optical element is particularly useful because while the surface contour can be adjusted to match the field curvature of the intermediate image, the Fresnel structure can be designed to reflect the incident light to concentrate that light into the [aperture of the eye lens] *exit pupil*. Typically, Fresnel lenses are not employed in high quality imaging systems because of the diffraction and/or gross image artifacts created by the Fresnel structure. However, since the Fresnel structure is located at the image surface in accordance with the present invention, the structure may be made especially fine with relatively little regard for diffraction effects. Further, unlike a conventional *light*-scattering screen, such a hybrid device may be displaced slightly from the intermediate image without forcing the final image out of focus, providing yet another degree of freedom for the optical designer.

The present invention therefore advantageously provides an optical system design which naturally and significantly reduces aberrations without the bulk or expense typical of conventional designs. Such reduction therefore provides a design which can be exploited to yield larger fields of view, larger exit pupils and larger eye reliefs than known imaging designs, while employing a compact system requiring relatively few imaging system elements. Thus, the present invention is ideally suited for imaging systems such as used in magnifiers, cameras, head-mounted displays, telescopes, microscopes, and binocular instruments. It will be understood that modifications to the invention might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An optical imaging system comprising:

an object imaging means for forming an intermediate image of an object image, said object imaging means producing particular aberrations in the intermediate image;

means for reversing at least some of the aberrations in the intermediate image comprising a convergent reflective medium positioned proximate the intermediate image; and a re-imaging means for re-imaging the intermediate image reflected by said reflective medium, said re-imaging means producing image aberrations similar to the aberrations produced by said object imaging means, thereby substantially cancelling the aberrations reversed by said reversing means in the re-imaged intermediate image.

2. The system of claim 1 wherein said convergent reflective medium comprises a concave mirror.

3. The system of claim 2 wherein said concave mirror further comprises a Fresnel structure formed on [the] *a* mirror surface *of said concave mirror*.

4. The system of claim 2 wherein said concave mirror further comprises a concave mirror substrate having a front surface and a back surface provided with a reflective coating, wherein said mirror substrate corrects optical aberrations in said intermediate image produced by said object imaging means, and precorrects for optical aberrations produced by said re-imaging means after said intermediate image is reflected by said reflective coating.

5. The system of claim 1 wherein said convergent reflective medium comprises a flat Fresnel mirror.

6. The system of claim 1 further comprising a beam splitter positioned between said object imaging means and [said] *a* reflective surface *of said reflective medium* for imaging the intermediate image reflected by said reflective medium to said re-imaging means.

7. The system of claim 1 wherein said means for forming an intermediate image comprises a projection means which produces a modulated scanning light beam to form the intermediate image, and said convergent reflective medium comprises a concave projection screen positioned substantially at the intermediate image.

8. The system of claim 7 wherein the light forming said intermediate image has a predetermined cone of incidence, and said concave projection screen comprises means for redistributing the light incident on any point of the screen surface into a cone of exodus larger than said cone of incidence.

9. The system of claim 1 wherein the light forming said intermediate image has a predetermined cone of incidence, and said means for reversing further comprises means for redistributing the light incident on any point of said convergent reflective medium into a cone of exodus larger than said cone of incidence.

*10. An optical system as recited in claim 1, wherein said means for forming an intermediate image comprises a projection means comprising a modulated scanning light beam to form said intermediate image.*

*11. An optical system, comprising:*

*a. an imaging means for forming an intermediate image, wherein said imaging means produces at least one first aberration in light exiting said imaging means;*

*b. a means for substantially reversing at least one said first aberration; and*

*c. a re-imaging means for re-imaging said intermediate image, wherein said re-imaging means produces at least one second aberration, and said at least one second aberration substantially cancels at least one said first aberration reversed by said reversing means.*

*12. An optical system as recited in claim 11, wherein said imaging means comprises a positive lens, wherein said positive lens produces at least one said first aberration, and said at least one said first aberration produced by said positive lens is similar to at least one said second aberration.*

*13. An optical system as recited in claim 11, wherein said imaging means forms said intermediate image from an image produced by an electronic imaging device.*

*14. An optical system as recited in claim 11, further comprising a beam splitter positioned between said imaging means and said means for reversing at least one said first aberration, wherein said beam splitter directs light from said imaging means to said means for reversing at least one said first aberration.*

*15. An optical system as recited in claim 11, further comprising a beam splitter positioned between said means for reversing at least one said first aberration and said re-imaging means, wherein said beam splitter directs light reflected by said means for reversing at least one said first aberration to said re-imaging means.*

*16. An optical system as recited in claim 11, wherein said means for reversing at least one said first aberration comprises a convergent reflective medium.*

*17. An optical system as recited in claim 11, further comprising a light redistributing means positioned proximate to said intermediate image for expanding a cone of light incident on said redistributing means into a larger cone of exodus.*

*18. An optical system as recited in claim 17, wherein said imaging means comprises a modulated scanning light beam to form said intermediate image.*

*19. An optical system as recited in claim 17, wherein said light redistributing means is reflective.*

*20. An optical system as recited in claim 11, further comprising a light redistributing means positioned proximate to said intermediate image, wherein said light redistributing means expands an exit pupil of said re-imaging means.*

*21. An optical system as recited in claim 20, wherein said imaging means comprises a modulated scanning light beam to form said intermediate image.*

*22. An optical system as recited in claim 20, wherein said light redistributing means is reflective.*

*23. An optical system as recited in claim 11, wherein said means for substantially reversing at least one said first aberration comprises a convergent optical element.*

*24. An optical system, comprising:*

*a. an imaging means for forming an intermediate image, wherein said imaging means produces at least one first aberration in light exiting said imaging means;*

*b. a means for substantially reversing the direction of a center of a light ray bundle exiting said imaging means; and*

*c. a re-imaging means for re-imaging said intermediate image, wherein said re-imaging means produces at least one second aberration, and said at least one second aberration substantially cancels at least one said first aberration.*

*25. An optical system as recited in claim 24, further comprising a light redistributing means positioned proximate to said intermediate image for expanding a cone of light incident on said redistributing means into a larger cone of exodus.*

*26. An optical system as recited in claim 25, wherein said imaging means comprises a modulated scanning light beam to form said intermediate image.*

*27. An optical system as recited in claim 25, wherein said light redistributing means is reflective.*

*28. An optical system as recited in claim 24, further comprising a light redistributing means positioned proximate to said intermediate image, wherein said light redistributing means expands an exit pupil of said re-imaging means.*

*29. An optical system as recited in claim 28, wherein said imaging means comprises a modulated scanning light beam to form said intermediate image.*

*30. An optical system as recited in claim 28, wherein said light redistributing means is reflective.*

*31. An optical system as recited in claim 24, wherein said means for substantially reversing the direction of a center of a light ray bundle exiting said imaging means comprises a convergent optical element.*

*32. An optical system, comprising:*

*a. an imaging means for forming an intermediate image, wherein said imaging means produces at least one first aberration in said intermediate image;*

*b. a curved surface proximate to said intermediate image comprising a light redistributing means for expanding a cone of light incident on said surface into a larger cone of exodus, whereby said curved surface reverses at least one said first aberration; and*

*c. a re-imaging means for re-imaging said intermediate image, wherein said re-imaging means intercepts a substantial portion of light from said curved surface, wherein said re-imaging means produces at least one second aberration similar to said at least one first aberration, thereby thereby canceling or reducing said at least one first aberration reversed by said curved surface.*

*33. An optical system, comprising:*

*a. an imaging means for forming an intermediate image, wherein said imaging means produces at least one first aberration in said intermediate image;*

*b. a means for reversing at least one said first aberration in said intermediate image, wherein said means for reversing at least one said first aberration comprises a convergent reflective medium; and*

*c. a re-imaging means for re-imaging said intermediate image reflected by said convergent reflective medium, wherein said re-imaging means produces at least one second aberration similar to said at least one first aberration, thereby canceling or reducing said at least one first aberration reversed by said reversing means in said re-imaged intermediate image.*

*34. An optical system as recited in claim 33, wherein said convergent reflective medium comprises a concave mirror.*

*35. An optical system as recited in claim 33, further comprising a beam splitter positioned between said convergent reflective medium and said re-imaging means, wherein said beam splitter directs light reflected by said convergent reflective medium to said re-imaging means.*

*36. An optical system as recited in claim 33, wherein said convergent reflective medium comprises a concave projection screen proximate to said intermediate image, and said means for forming an intermediate image comprises a projection means comprising a modulated scanning light beam to form said intermediate image.*

*37. An optical system as recited in claim 33, wherein said means for forming an intermediate image comprises a projection means comprising a modulated scanning light beam to form said intermediate image.*

*38. An optical system as recited in claim 33, wherein said means for reversing further comprises means for redistributing the light incident on a point of said convergent reflective medium into a cone of exodus larger than said cone of incidence.*

*39. A method of generating an image, comprising:*

*a. forming an intermediate image, wherein said intermediate image is characterized by at least one first aberration;*

*b. reversing a sign of said at least one first aberration in said intermediate image with a convergent reflective element; and*

*c. forming an image from said intermediate image with a re-imaging means, wherein said re-imaging means is characterized by at least one second aberration that is at least similar to said at least one first aberration.*

*40. A method of generating an image as recited in claim 39, wherein said intermediate image is formed with an imaging means comprising at least one positive optical element, said re-imaging means comprises at least one positive optical element, and said convergent reflective element produces negative aberration contributions that compensate at least one aberration contribution from said positive optical elements of said imaging means and said re-imaging means.*

*41. A method of generating an image as recited in claim 39, wherein said convergent reflective element comprises an element selected from the group consisting of a convergent mirror and a convergent Fresnel reflector.*

*42. A method of generating an image as recited in claim 39, wherein said intermediate image is formed proximate to said convergent reflective element.*

*43. An optical system, comprising:*

*a. a scanning modulated beam of light;*

*b. a projection surface comprising a light redistributing means, wherein an intensity of said beam of light is modulated to form an intermediate image on said projection surface, and said projection surface comprises a surface that absorbs light from said beam of light and emits light as an intermediate image; and*

*c. a re-imaging means, wherein said re-imaging means forms a virtual image of said intermediate image from light from said projection surface through an exit pupil viewable by an eye.*

*44. An optical system, comprising:*

*a. a scanning modulated beam of light, wherein said modulated beam of light comprises polychromatic light and said modulated beam of light is pre-aberrated so as to accommodate chromatic aberration by said re-imaging means;*

*b. a projection surface comprising a light redistributing means, wherein an intensity of said beam of light is modulated to form an intermediate image on said projection surface; and*

*c. a re-imaging means, wherein said re-imaging means forms a virtual image of said intermediate image from light from said projection surface through an exit pupil viewable by an eye.*

*45. An optical system, comprising:*

*a. a scanning modulated beam of light;*

*b. a projection surface comprising a light redistributing means, wherein an intensity of said beam of light is modulated to form an intermediate image on said projection surface;*

*c. a re-imaging means, wherein said re-imaging means forms a virtual image of said intermediate image from light from said projection surface through an exit pupil viewable by an eye; and*

*d. a beam splitter, wherein light from said scanning modulated image source reflects off of said beam splitter, then reflects off of said projection surface, then passes through said beam splitter, and then passes through said re-imaging means.*

*46. An optical system as recited in claim 45, wherein said beam splitter comprises an optical element selected from the group consisting of a flat window with a partially reflective coating, a flat multi-stack window, a polarizing beam splitter, and a cube beam splitter.*

*47. An optical system, comprising:*

*a. a means for forming a first image, wherein said first image comprises at least one image color component, and said first image is pre-aberrated with a first lateral chromatic aberration; and*

*b. a re-imaging means for forming a second image from said first image, wherein said re-imaging means causes a second lateral chromatic aberration of said second image relative to said first image, and said second lateral chromatic aberration of said second image caused by said re-imaging means substantially cancels said first lateral chromatic aberration of said first image.*

*48. An optical system as recited in claim 47, wherein said re-imaging means forms a virtual image.*

*49. An optical system as recited in claim 47, wherein said re-imaging means comprises a lens.*

*50. An optical system as recited in claim 47, wherein said second image is formed at a substantial distance from said optical system.*

*51. An optical system as recited in claim 47, wherein said means for forming said first image comprises an electronic imaging device.*

*52. An optical system as recited in claim 51, wherein said first image comprises a plurality of color components, and each color component is formed so as to pre-aberrate said first image.*

*53. A method of generating an image, comprising:*

*a. forming a first image, wherein said first image comprises at least one image color component, and said first image is pre-aberrated with a first lateral chromatic aberration; and*

*b. forming a second image from said first image, wherein the operation of forming said second image causes a second lateral chromatic aberration of said second image relative to said first image, and said second lateral chromatic aberration of said second image substantially cancels said first lateral chromatic aberration of said first image.*

*54. A method of generating an image as recited in claim 53, wherein said second image is a virtual image.*

*55. A method of generating an image as recited in claim 53, wherein said second image is formed at a substantial distance from said first image.*

*56. A method of generating an image as recited in claim 53, wherein said first image comprises a plurality of color components, and each color component is formed so as to pre-aberrate said first image.*

* * * * *